Figure 1:
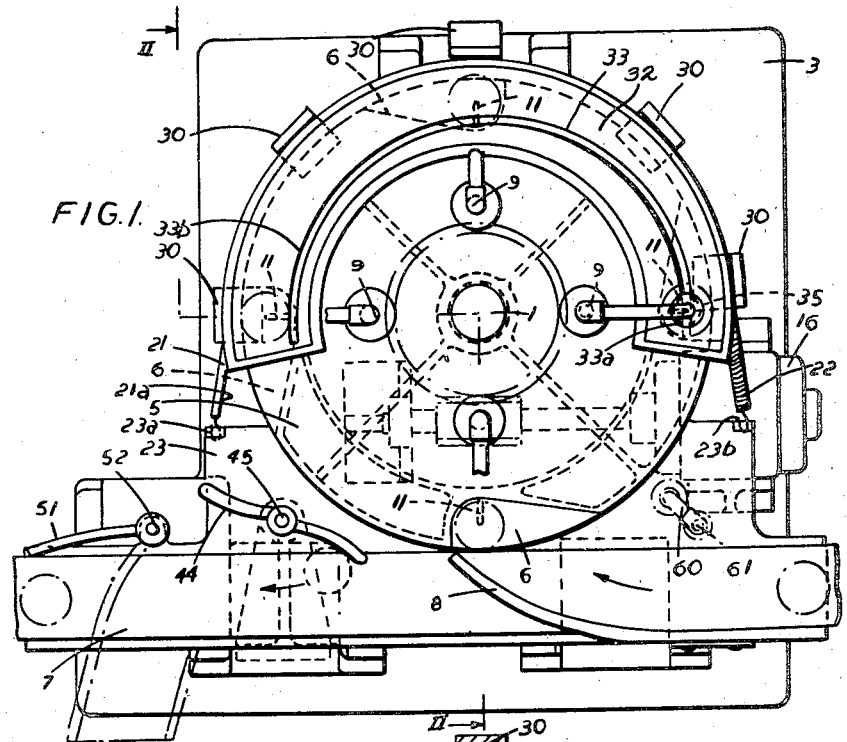

Nov. 25, 1947.  N. P. STOATE  2,431,519
INSPECTION APPARATUS FOR TRANSPARENT VESSELS
Filed Sept. 14, 1945  2 Sheets-Sheet 1

INVENTOR
NORMAN
PARKER
STOATE
BY
ATTORNEY

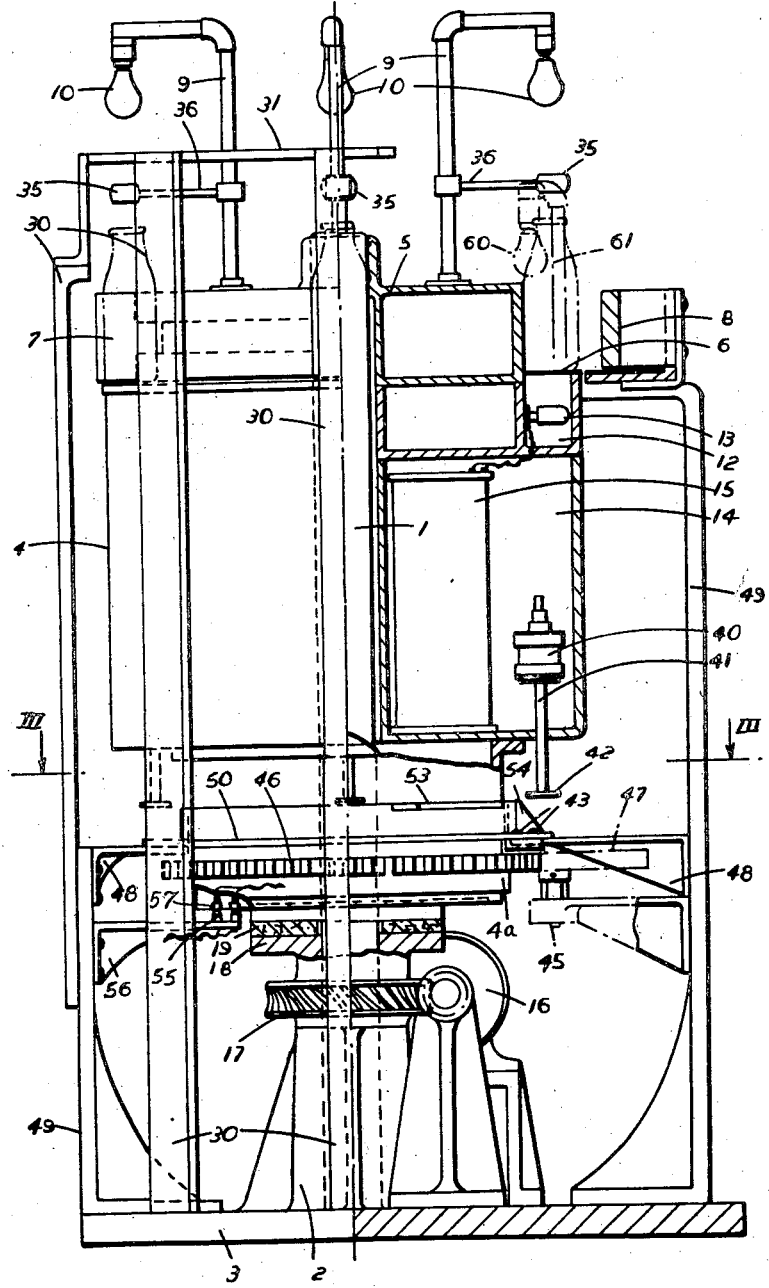

Patented Nov. 25, 1947

2,431,519

UNITED STATES PATENT OFFICE 2,431,519

INSPECTION APPARATUS FOR TRANS-
PARENT VESSELS

Norman Parker Stoate, Hampstead Garden Suburb, London, England, assignor to United Dairies Limited, London, England, a British company Application September 14, 1945, Serial No. 616,302
In Great Britain September 19, 1944

9 Claims. (Cl. 88—14)

This invention relates to apparatus for scanning the bottom of a transparent vessel to detect foreign bodies thereon, by means of light directed longitudinally through the vessel on to a light-sensitive device, and has for its object to provide a relatively inexpensive construction of such apparatus.

With an apparatus according to the invention, when a foreign particle on the bottom of a vessel passes across a portion of a radial slit in a movable screen which is in register with a fixed slit, the image of the portion of the slit in the fixed screen and which is in register with the slit in the movable screen will be partially or entirely obscured and the resulting reduction in light passing through the radial slit will influence a photo-electric device, such as a photocell, and bring about operation of an associated relay to give an indication of the presence of the particle.

The slit in the moving screen may, when a vessel is in scanning position, extend substantially radially inwardly from the centre of said bottom towards or away from an axis of rotation of the carrier for the movable screen, the slit in the fixed screen having one of its ends in register with the path of the outer end of said radial slit and the other of its ends in register with the path of the inner end of said radial slit.

The width of the slit in the fixed screen and the degree of lateral displacement of said slit per unit length thereof, must be so selected that, during one revolution of the vessel, the minimum size of particle to be detected will, at some time during said revolution, pass over the portion of said last-mentioned slit of which the image is, at that time, being projected on to the slit in the movable screen.

Preferably the radial slit is formed in a support for the rotating vessel, which support then constitutes the moving screen, and such support may be constituted by a platform in a recess in a rotating head, the recess serving to locate the vessel on the platform. The head may be provided with a number of such platforms and recesses and may rotate relatively to a stationary yielding belt with which the vessels engage as the head rotates, whereby the vessels are rotated on the platforms.

The photo-electric device is preferably in the form of a photo-electric cell arranged to control an electric circuit in such a way that if the intensity of the light falling on the cell is reduced below a predetermined value the change in the current flowing in the circuit operates a device to give an indication of the presence of a foreign body in the vessel.

As the centrifugal force due to the rotation of the vessel tends to cause any particle therein to move to the periphery of the bottom of the vessel it is preferred to start the scanning operation at the centre of the bottom of the vessel and work towards the periphery. If this were not done a particle initially at the centre might fly to the periphery after the peripheral area had been scanned and before the centre had been scanned so that this particle would escape the scanning operation altogether and would remain undetected.

Accordingly it is preferred that the leading end of the slit in the stationary screen shall be over the centre of the bottom of the vessel and that the progressive displacement of the slit shall be from the centre towards the inner or outer edge of the annular path traced out by the moving screens as they rotate with the carrier, according to whether the radial slits extend from the centre of their respective screens towards or away from the axis of rotation of the carrier.

Preferably in order to ensure thorough scanning of the peripheral area of the vessel bottom, the terminal portion of the slit in the fixed screen is made concentric with the path of rotation of the carrier over a length at least equal to the distance travelled by a vessel during one revolution thereof.

In order that the invention may be more completely understood, one embodiment thereof will now be described by way of example, with reference to the accompanying drawings which illustrate the invention applied to a machine for inspecting milk bottles to detect foreign particles on the bottoms thereof.

In the drawings:
Fig. 1 is a plan of the apparatus,
Fig. 2 is a section on the line II—II of Fig. 1, and
Fig. 3 is a sectional plan on the line III—III of Fig. 2.

In the drawings like references indicate the same or similar parts.

Figure 3:
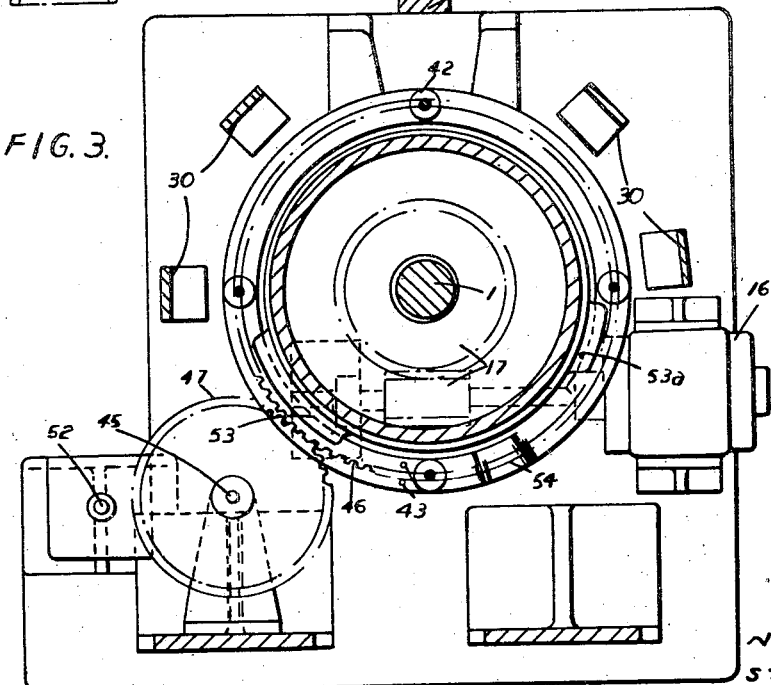

In the construction illustrated in Figs. 1 to 3 the apparatus comprises a vertical central shaft 1 fixed in a support 2 carried by a base plate 3. Rotatably mounted on the shaft 1 is a casing 4 on the upper part of which is carried a head 5 comprising four platforms 6 to receive the bottles.

The bottles are fed to the rotating head 5 by a conveyor band 7 which may be driven by any known means, a guide 8 being provided to feed the bottles on to the platform 6; the head being recessed at the platforms as shown in order to locate a bottle on the platform.

Depending from a support 9 adjacent each platform 6 is a lamp 10 which is disposed immediately above the centre of the respective platform 6 so that the light from the lamp passes longitudinally through the mouth and bottom of a bottle on the platform.

Formed in each of the platforms 6 is a narrow radial slit 11 and below each platform there is formed within the head 5 a chamber 12 within which is housed a photocell 13.

The area of this slit 11 must be relatively small compared with that of the bottom of the bottle and the length and disposition of the slit 11 must be such that the smallest particle which the apparatus is intended to detect, will, whether located right against the inside wall of the bottle, or at the centre, or between these localities, reduce the quantity of light reaching the slit 11 to an extent sufficient to effect the photocell 13.

There is a chamber 12 containing a photo-electric device which, as exemplified in the drawing is a photocell 13, a cell 13 being below each platform 6 and, below the chambers 12, the casing 4 is divided into four compartments 14 which serve to house the amplifiers for the photocells, one of said amplifiers being shown diagrammatically at 15 in Fig. 2.

The lamps 10 may be shaded to prevent light from one lamp affecting the cell associated with another.

The casing 4 is rotated by an electric motor 16, which, through a worm gear 17 drives a clutch element 18 freely mounted on the shaft 1. The casing 4 rests freely on a friction disc 19 disposed between the bottom 4a of the casing 4 and the clutch element 18, the weight of the casing being sufficient to provide an effective friction grip and consequent driving of the casing from the motor.

Connected at one end to a lug 23a on a fixed frame member 23 is a belt 21 of flexible but inextensible material, e. g. canvas, the inside of which is lined with a friction material 21a such as rubber. The other end of said belt is connected by a spring 22 to another fixed lug 23b so that the belt embraces the head 5.

As the casing 4 rotates and carries the bottles round, the external wall of each bottle engages the lining 21a of the belt 21 whereby the bottles are rotated about their longitudinal axes on the platforms 6 as they travel round bodily with the head 5.

Rigidly mounted on vertical standards 30 is a frame 31 carrying a screen 32 which is horizontally disposed and overhangs the path of the platforms 6, the screen being disposed below the lamps 10 and above the tops of the bottles when they are in position on a platform. Formed in this screen 32 is a long curved slit 33 of the form described below.

Below each lamp 10, and below the screen 32 is a lens 35 carried on an arm 36 projecting from the corresponding support 9.

The slit 11 in each platform 6 is disposed in such a position that when a bottle is in position on the platform this slit is substantially radial of the bottom of the bottle and extends across the long slit 33 in the fixed screen when a platform is under the latter, the direction of said slit 11 being from a point just beyond the centre of the platform towards the axis of rotation of the head.

There is thus for each platform 6 a lamp 10 above the screen 32 and a lens 35 below the screen, said lamps and lenses rotating with the head relatively to the screen, which remains stationary. Accordingly, as the head 5 rotates, each lens 35 will project across the radial slit 11 in each platform an image of the portion of the fixed slit 33 which is instantaneously above the lens.

In the embodiment illustrated the slit 33 in the stationary screen 32 has the following form.

Assuming that one of the platforms 6 with a bottle thereon has just passed under the leading end of the screen 32, then the leading end 33a of the slit 33 in the screen will be just over the centre of the bottom of the bottle. At this time the bottle has engaged the flexible belt 21 and is rotating about its longitudinal axis as the head continues its rotation. The slit 33 then extends in a substantially spiral path towards the inner edge of the screen, the rate of decrease in radius of the slit 33 depending on the width of said slit and the distance which a given point on the platform moves during one revolution of the bottle about its axis.

Taking the axis of rotation of the head 5 as the centre of the spiral, the decrease in the radius of the spiral, in a length equal to the distance moved by a point on the platform directly under the slit 33 during one revolution of the bottle must be small in relation to the size of the smallest particle to be detected.

Thus, as the head 5 rotates, the image of the portion of the slit 33 in the fixed screen 32 which is projected down on to the radial slit 11 in the platform 6 moves along said radial slit from the inner end to the outer end thereof. The length of the flexible belt 21 must be such as to maintain the bottle in rotation through this movement of the aforementioned image.

Assuming that the spiral slit 33 has a width equal to one eighth of the internal radius of the bottom of the bottle a minimum of four revolutions of the bottle will be required to effect complete scanning and the spiral slit will therefore have a length equal at least to the length of travel of a platform 6 while the bottle supported thereby is making four revolutions.

The final portion 33b of the spiral slit 33 is however truly circular, having a radius such that this circular portion, if projected vertically downwards, would lie just inside the bottle and contiguous to the wall thereof. By this means the outer peripheral area of the bottom of the bottle is thoroughly scanned.

Each photocell 13 is arranged to control an electric circuit in such a way that, if the intensity of the light falling on the cell is reduced below a predetermined value, the change in the current flowing in the circuit operates a device to give an indication of the presence of a foreign body in the bottle.

To this end the photocell controls, through the amplifier 15, a magnet 40, of which the armature is in the form of a trip rod 41 carrying at its lower end an insulated contact disc 42.

The magnet is normally energised and is de-energised when the light falling on the photocell is reduced due to a foreign body. When the magnet thus becomes de-energised the trip rod 41 drops and connects a pair of contacts 43 by means of its disc 42.

As already mentioned the head 5 rotates about the shaft 1 and during this rotation the bottles rotate about their axes whereby the bottom of each bottle is scanned by means of the co-operative action of the spiral slit 33 and the radial slit 11.

If during this scanning operation a foreign body is present in a bottle this body, on passing over a portion of the slit 11 which is directly below a portion of the spiral slit 33, will reduce the light falling on the photocell 13 and the current flowing through the amplifier 15 will be increased. This increased current opens the contacts of a relay, as will be explained later, whereby the current supply to the magnet 40 is cut off and the trip rod 41 allowed to fall.

The fall of the trip rod is utilised to eject the defective bottle and the means for effecting this operation will now be described.

The bottles are discharged from the head 5 on to the conveyor band 7 by means of rotating fingers 44 which act alternately, being secured to a shaft 45 which is driven at a speed relative to that of the casing such that the bottle, when impelled by one of the fingers 44, travels faster than when impelled by the head 5. This shaft is rotated by means of gear teeth 46 cut on the lower part of the casing 4, which teeth engage with a gear wheel 47 secured to the shaft 45.

Mounted on brackets 48 secured to standards 49 rising from the base plate 3 is a fixed ring 50 carrying the pair of insulated contacts 43 which are connected to apparatus for releasing a guide 51 for ejecting the defective bottle from the band 7 after said bottle has been discharged from the head on to said band.

This guide 51 is secured to a shaft 52 and is normally latched out of the path of the bottles as they pass along on the band, a magnet for releasing the latch being energised when the contacts 43 are bridged by the disc 42. When the latch is released a spring pulls the guide 51 into the path of the bottles so that the defective bottle is guided off the band 7 on to a receiving platform.

It will be understood that a bottle in which no foreign body has been detected will, in passing off the platform 6, tend to release the trip rod, since the walls of the bottle in passing over the slit 11 will reduce the light reaching the photocell.

In order to obviate this incorrect release of the trip rod, a guard plate 53 is provided above the ring 50, this plate being disposed so that its upper surface is just level with the under-surface of the disc 42 on the trip rod 41 when the latter is in its raised position. When the magnet is de-energised due to the bottle walls passing over the slit 11, the trip rod is prevented from dropping by the guard plate 53.

If, however, the magnet 40 has already been de-energised due to a foreign body in the bottle, the trip rod 41 will have dropped until arrested by its disc 42 engaging the ring 50.

The disc 42 will therefore pass round under the guard plate 53 and will bridge the contacts 43, thereby releasing the ejector finger or guide 51.

Also the two ends of the frame 31 carrying the screen 32 will, as each radial slit 11 passes under them reduce the light falling on the corresponding photocell and cause a false de-energisation of the associated magnet 40. In order to obviate false release of the trip rod 41 due to this cause, the guard plate 53 may be extended below the one end of the frame 31 and an additional guard plate 53a provided below the other end of said frame.

The contacts 43 must be placed so as to give the necessary delay in the release of the guide 51, which release must occur after the preceding bottle has passed the position which the guide occupies when released, but before the bottle to be ejected has reached a position in which it would be struck by the guide during the movement of the latter.

In order to reset the trip rod 41 into its upper position after it has been released, a ramp 54 is provided on the ring 50. Conveniently this ramp 54 is placed so as to be engaged by the disc 42 on the trip rod 41 just after a bottle has arrived on the associated platform 6. By this means the trip rod 41 is reset after having been released either by a foreign body in the bottle which was previously on the platform, or by the passage of the walls of the next following bottle over the slit 11 while said following bottle was passing on to the platform.

Current is supplied to the electrical circuits of the apparatus through brushes 55 secured to a fixed bracket 56 and engaging with slip rings 57 secured to the underside of the lower portion of the casing 4.

In some cases it has been found that the mere restoration of normal illumination after the particle has passed over the slit 11 is insufficient to reduce the current in the photocell circuit sufficiently to open the relay, with the result that the magnet 40 remains de-energised and releases the trip rod 41 again immediately after it has been reset. In order to overcome this difficulty means may be provided for increasing the illumination of the bottom of the bottle while the trip rod 41 is in the region of the resetting device.

Such means for increasing the illumination may comprise a supplemental lamp 60 supported on a fixed standard 61 adjacent the rotating head 5 and positioned to direct its light onto the platforms 6 as they pass. This lamp 60 is also positioned between the contacts 43 and the ramp 54 for resetting the trip rod 41.

After the platform 6 has passed beyond the region illuminated by the supplemental lamp 60 the disc 42 engages the ramp 54 as already described, and, since now the magnet 40 is re-energised, the rod 41 is raised and held in its uppermost position.

Instead of making the slit in the fixed screen of spiral form this slit may be made in a series of contiguous sections each having the shape of an arc of a circle, the radius of each section being less than that of the preceding section, having regard to the direction of travel of the bottles below the screen. The contiguous ends of the sections merge into one another in order to prevent interference with the image projected on to the radial slit as the platforms pass under the junction of two adjacent sections.

If the screen itself is made in sections the slit will be discontinuous at the joints between adjacent sections, in which case a guard plate will be provided under each joint to prevent the trip rod from dropping as the platform passes the joint.

The slit in the fixed screen may also be of such a form that the distance from its centre line to the edge of the semicircular screen increases uniformly along the slit provided that the width of the slit is so selected in relation to the minimum size of particle to be detected that during one revolution of the bottle such particle will at some time during said revolution pass over the slit in the fixed screen whatever the position of the particle in the bottle.

The screen may be made of glass or other transparent material, painted or coated with an opaque material over the whole of its surface except that part occupied by the slit, so that in this case the slit is constituted, not by cutting away the material of the screen but by leaving the appropriate area of the screen uncovered.

The source of light may be above the vessel and the photo-electric device below it, as shown in the drawings or vice versa.

The relay above referred to is connected to the amplifier 15 in such a way that an increase in current through the amplifier opens the relay contacts, which contacts are in the circuit of the magnet 40 so that the said increase in current breaks the magnet circuit and de-energises it. On a reduction in the current through the amplifier to its normal value the relay contacts close thereby establishing the magnet circuit again.

I claim:

1. Apparatus for scanning the bottom of a transparent vessel to detect foreign bodies thereon comprising in combination a movable assembly including means for locating a vessel in scanning position thereon, a screen disposed below the bottom of the vessel when said vessel is so located, said screen being formed with a slit having an area small in relation to that of the vessel bottom, and which, when the vessel is in scanning position is substantially radial of said bottom, a photo-electric device disposed on one side of said screen, a light source disposed on the other side of said screen to direct light longitudinally through the mouth and bottom of the vessel, when in scanning position, towards said photo-electric device, and a lens disposed between the light source and the photo-electric device, and above the vessel mouth when said vessel is in scanning position, a fixed screen disposed between the paths of motion of the light source and the photo-electric device and above the vessel mouth, means for moving said assembly from one end of said fixed screen to the other end thereof, and means for rotating a vessel supported on said assembly about its longitudinal axis as said assembly moves, said fixed screen being formed with a longitudinal slit having a length such that the vessel makes a plurality of revolutions while passing along it during movement of the assembly, said slit being progressively displaced laterally of the fixed screen from one side of the path traced by the slit in the movable screen to the other side of said path, whereby as the movable assembly passes from one end to the other of the fixed screen, the lens projects on to the slit in the movable screen an image of the portion of the slit in the fixed screen which is in register with the slit in the movable screen, which image moves from one end to the other end of said last mentioned slit.

2. Apparatus for scanning the bottom of a transparent vessel to detect foreign bodies thereon comprising in combination a rotatably mounted carrier, a screen on said carrier, means mounted on said carrier for supporting a vessel in scanning position over said screen with its longitudinal axis spaced from that of the carrier, said screen being formed with a slit having an area small in relation to that of the vessel bottom and which, when the vessel is in scanning position, is substantially radial of the vessel bottom, means for rotating said carrier, means for rotating a vessel supported by the carrier about its longitudinal axis as the carrier rotates, a photo-electric device mounted on said carrier on one side of said screen, a light source mounted on said carrier on the other side of said screen to direct light longitudinally through the mouth and bottom of the vessel towards said photo-electric device, a lens mounted on said carrier between said light source and said photo-electric device and above the vessel mouth, a fixed screen of arcuate form disposed parallel to the plane of rotation of the carrier and above the path of movement thereof, between the paths of motion of the light source and the photo-electric device and above the vessel mouth, said fixed screen being provided with a slit having a length such that the vessel makes a plurality of revolutions while passing along it during rotation of the carrier, said slit being progressively displaced laterally of the fixed screen from one side of the path traced by the slit in the movable screen to the other side of said path whereby when the movable screen passes under the fixed screen from one end to the other end thereof during rotation of the carrier, the lens projects on to the slit in the movable screen an image of the portion of the slit in the fixed screen which is in register with the slit in the movable screen, which image moves from one end to the other end of the slit in said last mentioned screen.

3. Apparatus for scanning the bottom of a transparent vessel to detect foreign bodies thereon comprising in combination a rotatably mounted carrier, a screen on said carrier, means mounted on said carrier for supporting a vessel in scanning position over said screen with its longitudinal axis spaced from that of the carrier, said screen being formed with a slit having an area small in relation to that of the vessel bottom and which, when the vessel is in scanning position is substantially radial of the vessel bottom and extends inwardly from the centre of said bottom towards the axis of rotation of the carrier, means for rotating said carrier, means for rotating a vessel supported by the carrier about its longitudinal axis as said carrier rotates, a photo-electric device mounted on said carrier on one side of said screen, a light source mounted on said carrier on the other side of said screen to direct light longitudinally through the mouth and bottom of the vessel towards said photo-electric device, a lens also mounted on said carrier between the light source and the photo-electric device and above the vessel mouth, and a fixed screen of arcuate form disposed parallel to the plane of rotation of the carrier and above the path of movement thereof, above the vessel mouth, and between the paths of motion of the light source and the photo-electric device, said fixed screen being provided with a slit having a length such that the vessel makes a plurality of revolutions while passing along it and said last mentioned slit having one of its ends in register with the path of the outer end of said radial slit and the other of its ends in register with the path of the inner end of said radial slit.

4. Apparatus for scanning the bottom of a transparent vessel to detect foreign bodies thereon comprising in combination a movable assembly including means for locating a vessel in scanning position thereon, a screen disposed below the bottom of the vessel when said vessel is so located, said screen being formed with a slit having an area small in relation to that of the vessel bottom, and which, when the vessel is in scanning position is substantially radial of said bottom, a photo-electric device disposed on one side of said screen, a light source disposed on the other side of said screen to direct light longitudinally through the mouth and bottom of the vessel, when in scanning position, towards said photo-electric device, and a lens disposed between the light source and the photo-electric device, and above the vessel mouth when said vessel is in scanning position, a fixed screen disposed between the paths of motion of the light source and the photo-electric device and above the vessel mouth, means for moving said assembly from one end of said fixed screen to the other end thereof, and means for rotating a vessel about its longitudinal axis as said assembly moves, said fixed screen being formed with a longitudinal slit having a length such that the vessel makes a plurality of revolutions while passing along it during movement of the assembly, said slit being progressively displaced laterally of the fixed screen from one side of the path traced by the slit in the movable screen to the other side of said path, whereby as the movable assembly passes from one end to the other of the fixed screen, the lens projects on to the slit in the movable screen an image of the portion of the slit in the fixed screen which is in register with the slit in the movable screen, which image moves from one end to the other end of said last mentioned slit, and the width of the slit in the fixed screen and the degree of lateral displacement of said slit per unit length thereof being so selected that during one revolution of the vessel the slits scan all areas of the bottom of the vessel which are at least as large as the smallest particle to be detected.

5. Apparatus for scanning the bottom of a transparent vessel to detect foreign bodies thereon comprising in combination a rotatably mounted carrier, a screen on said carrier, means mounted on said carrier for supporting a vessel in scanning position over said screen with its longitudinal axis spaced from that of the carrier, said screen being formed with a slit having an area small in relation to that of the vessel bottom and which, when the vessel is in scanning position, is substantially radial of the vessel bottom, means for rotating said carrier, means for rotating a vessel supported by the carrier about its longitudinal axis as the carrier rotates, a photo-electric device mounted on said carrier on one side of said screen, a light source mounted on said carrier on the other side of said screen to direct light longitudinally through the mouth and bottom of the vessel towards said photo-electric device, a lens mounted on said carrier between said light source and said photo-electric device and above the vessel mouth, a fixed screen of arcuate form disposed parallel to the plane of rotation of the carrier and above the path of movement thereof, between the paths of motion of the light source and the photo-electric device and above the vessel mouth, said fixed screen being provided with a slit having a length such that the vessel makes a plurality of revolutions while passing along it during rotation of the carrier, said slit being progressively displaced laterally of the fixed screen from one side of the path traced by the slit in the movable screen to the other side of said path whereby when the movable screen passes under the fixed screen from one end to the other end thereof during rotation of the carrier, the lens projects on to the slit in the movable screen an image of the portion of the slit in the fixed screen which is in register with the slit in the movable screen, which image moves from one end to the other end of the slit in said last mentioned screen, and the width of the slit in the fixed screen and the degree of lateral displacement of said slit per unit length thereof being so selected that during one revolution of the vessel the slits scan all areas of the bottom of the vessel which are at least as large as the smaller particle to be detected.

6. Apparatus according to claim 1 wherein the progressive displacement of the slit in the fixed screen is in the direction of movement of the radial slit in the movable screen.

7. Apparatus according to claim 5 wherein the progressive displacement of the slit in the fixed screen is in the direction of movement of the radial slit in the movable screen.

8. Apparatus according to claim 2 wherein the progressive displacement of the slit in the fixed screen is in the direction of movement of the radial slit in the movable screen and the terminal portion of the slit in the fixed screen adjacent the outer end of the radial slit is concentric with the path of rotation of the carrier over a length at least equal to the distance travelled by a vessel during one revolution thereof.

9. Apparatus according to claim 5 wherein the progressive displacement of the slit in the fixed screen is in the direction of movement of the radial slit in the movable screen and the terminal portion of the slit in the fixed screen adjacent the outer end of the radial slit is concentric with the path of rotation of the carrier over a length at least equal to the distance travelled by a vessel during one revolution thereof.

NORMAN PARKER STOATE.